Figure 1:
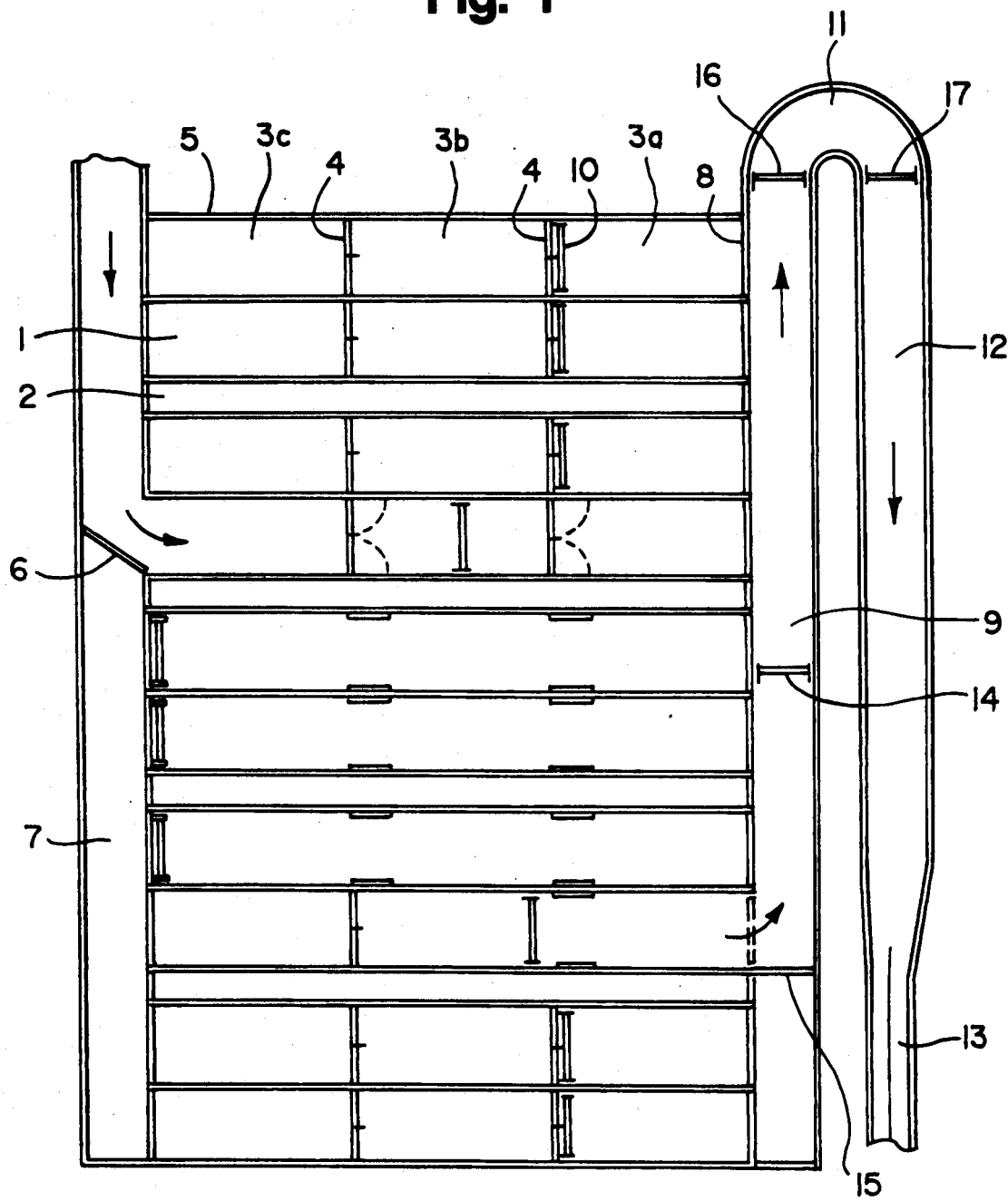

United States Patent [19]

Joergensen et al.

[11] Patent Number: 5,009,191

[45] Date of Patent: Apr. 23, 1991

[54] SYSTEM FOR THE STALLING OF ANIMALS

[75] Inventors: Tage W. Joergensen, Copenhagen; Leif Christensen, Vaerloese, both of Denmark

[73] Assignee: Slagteriernes Forskningsinstitut, Denmark

[21] Appl. No.: 413,340

[22] Filed: Sep. 27, 1989

[51] Int. Cl.⁵ .............................................. A01K 1/02
[52] U.S. Cl. ...................................... 119/20; 452/54; 452/53
[58] Field of Search .................... 17/1 A, 45; 119/20, 119/27, 155, 14.03

[56] References Cited

U.S. PATENT DOCUMENTS

| | | | |
|---|---|---|---|
| 243,809 | 7/1881 | Sparrow | 17/45 X |
| 2,279,840 | 4/1942 | Robinson et al. | 119/20 X |
| 3,203,033 | 8/1965 | Banse | 119/20 X |
| 3,215,120 | 11/1965 | Geary | 17/1 A |
| 3,487,497 | 1/1970 | Jorgensen et al. | 17/1 A |
| 3,799,115 | 3/1974 | Fullerton et al. | 119/20 |
| 3,805,741 | 4/1974 | Thompson et al. | 119/20 |
| 4,275,685 | 6/1981 | Hopkins | 119/155 X |
| 4,535,723 | 8/1985 | Gealy | 119/20 |

FOREIGN PATENT DOCUMENTS 0110525  4/1964  Czechoslovakia ................. 17/1 A Primary Examiner—Robert P. Swiatek
Assistant Examiner—Todd E. Manahan

[57] ABSTRACT

Animals such as pigs which are to be slaughtered at slaughterhouses are unloaded from the transport truck and driven into pens and stalled in these for some time, until they are driven out of the pens and over to a stunning apparatus. The pigs of a supplied lot to the slaughterhouse, or part of the supplied lot, are treated as a separate unit during one or more of the above-mentioned stages of treatment, which means that pigs of a unit are to be constantly kept separated from pigs belonging to other units. Each unit may comprise e.g. 15 pigs. The treatment of the animals in units reduces their aggressions, and their well-being is increased, which will result in a lower incidence of rind damages, blood splashings and deviant meat quality of the carcasses. A system for stalling of the pigs includes a number of oblong pens (1), which are placed next to each other. Each of the pens has an entrance gate (6), an exit gate (8) and a driving gate (10) which is movable in the longitudinal direction of the pen. Each pen is equipped with one or more stationary intermediate gates (4), which are placed at such a distance from each other, the entrance gate (6) and the exit gate (8), that the pen is divided into several rooms (3a, 3b, 3c). The size of each room corresponds preferably to the size of the unit of pigs which is to be treated.

7 Claims, 2 Drawing Sheets

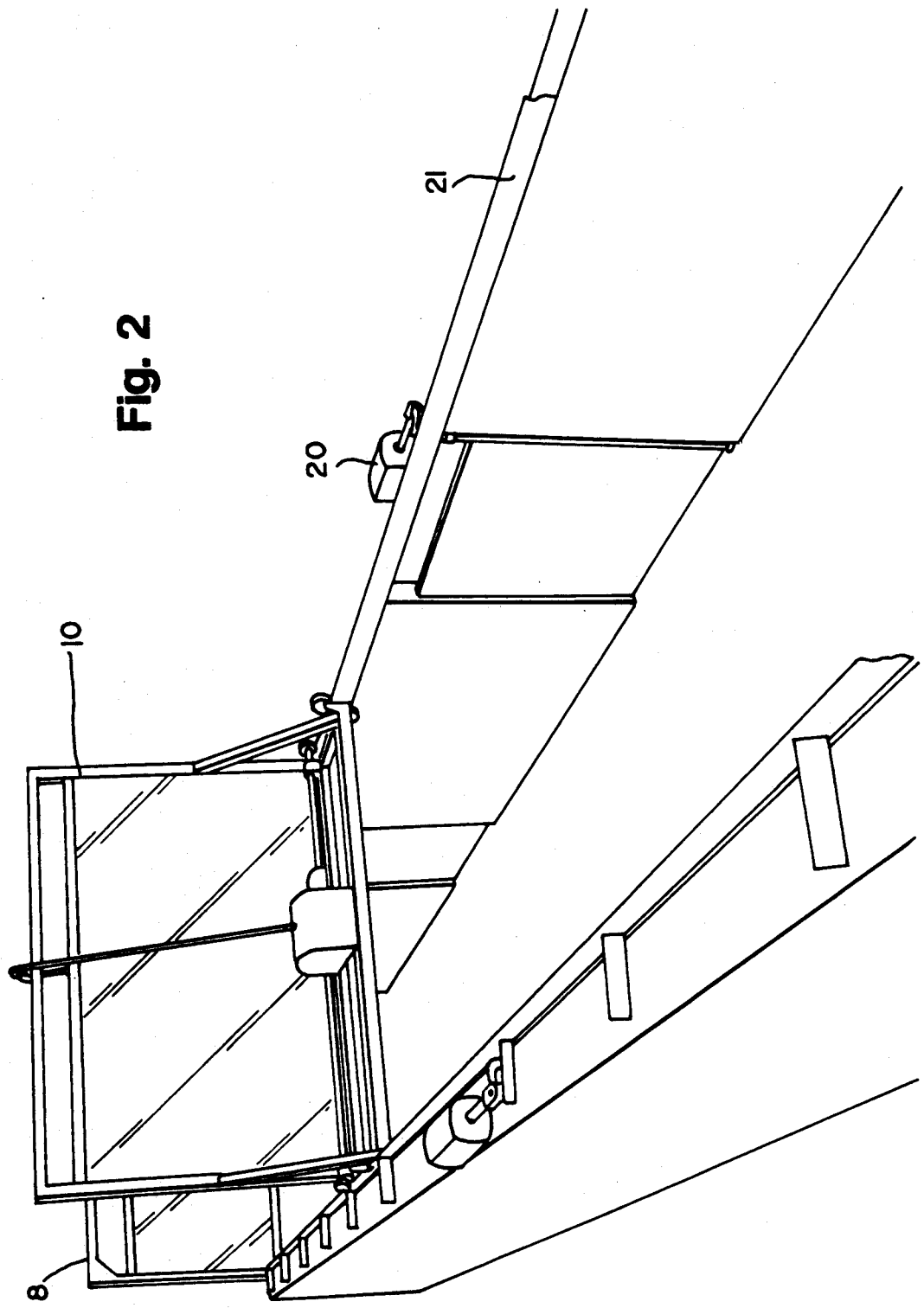

SYSTEM FOR THE STALLING OF ANIMALS

BACKGROUND OF THE INVENTION

The present invention relates to a procedure for the treatment of animals such as pigs in slaughterhouses, wherein the pigs of a supplied lot are unloaded from the transport truck, driven into pens, and stalled in these, after which the pigs are driven out of the pens and over to a stunning apparatus. The present invention has particular utility in processing hogs, but it can also be used with other animals.

When pigs have been unloaded a the slaughterhouse they are stalled for a short time in the pen facilities of the slaughterhouse, in order that they may rest after the transportation. At the unloading and during the stalling the pigs will be appraised by the veterinary inspector, and he will sort out the sick and weak animals, which are unfit for the usual procedure.

The usual procedure for the stalling is that the transport trucks with the pigs drive over to the unloading platform of the slaughterhouse where the pigs are driven out of the transport truck and collectively guided into a driving-in passage, which is connected with a number of pens. The entrance gate into a pen will be opened by the operator, who will lead the pigs into the pen by means of a driving board, until the pen is full. Then the gate of the next pen will be opened, which will be filled in the same way, and maybe supplemented with pigs from the next transport trucks.

Today, each slaughterhouse pen has a fixed capacity of between 40 and 60 animals. However, the loading capacity of the transport trucks arriving at the slaughterhouse may vary considerably, between 40 and 100 pigs per truck. This means that pigs from different truck loads will usually be mixed during the stalling, since the operator has to take care that the pen is not crammed beyond capacity and that the area of at least 0.5 $m^2$ per pig is available in the pen, as required by the authorities.

When the stalled animals are to be slaughtered, the operator will open a gate located at the exit end of the pen, and the operator will drive the animals out of the pen and into a passage at the end of the pens by means of a driving board. Some plates operated by chains may be provided in the passage which mechanically drive the pigs in the direction of a passage. In this passage the animals will be arranged so they stand one after the other, and then they will be admitted one by one into the stunning apparatus.

U.S Pat. Specification No. 3,487,497 refers to a pen system having a plate in each pen, which plate is movable in the longitudinal direction of the pen. The operator may manually drive the pigs out of the pen by means of the board, after an elevating gate located at the exit of the pen has been opened by the operator. When the pigs have been driven out into the passage at the end of the pens, they will be directed mechanically towards the next passage by some driving plates which are operated by a chain conveyor system.

In the well-known treatment of pigs it may be difficult for the operator to get the pigs into and out of the pens and over to the stunning apparatus because the pigs are in an unaccustomed situation and they will react against all kinds of exposure. The nervousness of the pigs during the treatment at the slaughterhouse will also cause struggles between them and a high stress level. The result of these conditions is that some of the carcasses suffer from rind damages, blood splashings and deviant mean quality. Consequently, this will unfavorably affect the economy of the slaughterhouse.

SUMMARY OF THE INVENTION

The object of this invention is to establish a procedure for the treatment of pigs in slaughterhouses by which pigs will be easier to handle and by which they will react less violently and aggressively towards other animals of the same species than by the well-known treatment of pigs in slaughterhouses.

The procedure according to the invention is characterized in that the pigs of a supplied lot or part of the lot will be treated as one separate unit during one or more of the stages of treatment mentioned, the pigs of one unit constantly being kept separated from pigs belonging to other units.

By this method of treating the pigs as separate units the aggressions of the animals will be reduced. The reason for that is, among other things, that already during the transportation to the slaughterhouse, pigs of a unit have essentially accepted their rank among the other pigs of the unit. Therefore, there is no need for them to compete with each other in the slaughterhouse, as long as they are kept apart from animals of other lots supplied. Consequently, the stress level of the pigs is suitably low for the animals to be driven into pens, stalled in these and/or driven out of the pens by means of a controlled, mechanical system, which will first of all lead to uniform time and ways of treatment, and secondly it will prevent interaction between the pigs and the operator.

The result of both of these conditions is that there will be less stress on the pigs. Therefore, the procedure according to this invention will render possible a treatment of the animals which is in agreement with their natural behavior pattern. It gives them a considerably higher level of well-being than by the traditional treatment, and this will also lighten the work burden of the operator. The carcasses will have a lower incidence of rind damages, blood splashings and deviant meat quality than by the traditional treatment in slaughterhouses.

By the words "a supplied lot" is meant a quantity of animals which is supplied to and/or transported to the slaughterhouse as one separate unit. If the body of the truck is not divided into rooms, the whole consignment will represent a supplied lot. On the other hand, if the body of the truck is divided into e.g. three rooms, the consignment will represent three supplied lots, no matter whether or not the animals come from the same pig breeder.

The entire supplied lot may constitute the separate unit, which will be treated in accordance with the invention. This will especially be the case when the supplied lot includes only a few pigs, such as the number of 15 pigs per supplied lot as stipulated for transport by container.

The separate unit of pigs treated in accordance with this invention may also constitute a certain fraction of the supplied lot, e.g. half the number of pigs delivered in a room of the truck body. The other half of the supplied lot may then constitute another separate unit. Thus, a supplied lot of 40 pigs may be divided into two units of 20 pigs each.

The procedure according to the invention may be effected while retaining the pattern of delivery used so far with truck loads of different volume. Instructions may also be given to pig breeders and carriers that they are to deliver the pigs in certain, fixed units, corresponding to the size of the rooms in the slaughterhouse pens. By doing this, an optimum utilization of the capacity of the pens may still be achieved. This will also make it possible to control the supply of pigs, since it will be possible for the slaughterhouse, as soon as it has received information of the volume of supplied lots for one day, to calculate the volume of supplies and to take precautions accordingly.

The incidence of pigs which have to stay overnight in the slaughterhouse pens will be reduced by such a controlled arrangement of supplies.

In spite of the need for big supplies of pigs and high speed of work which has arisen at the slaughterhouses, it has become possible by means of the procedure according to the invention to make allowance for the behavior and instincts of the pigs. The pigs receive a humane treatment under the industrialized conditions which are prevailing in modern slaughterhouses.

An embodiment of the invention is characterized in that the separate units each comprise a number of pigs corresponding to a flock. By this limited size of the units to be treated the animals will be less stressed than they would be in bigger units, since the natural behavior pattern and instinct of rank of the animals work considerably better in small-sized units than in big ones, where the animals can no longer act as a flock. The division into flocks as mentioned facilitates the driving, and the cramming of pigs in passages and pens is prevented. Also the inspection, supervision and driving of the pigs will be facilitated.

The unit size in question, corresponding to a flock, is also in practice the smallest, economic unit which may be adapted to the conditions of the pig breeders and carriers if there is to be a general line of pigs from breeder via carrier to the slaughterhouse.

Therefore, when the number of pigs used corresponds to a flock, this is adapted to the unit size which may in practice be established in pigsties and on transport trucks.

By the embodiment mentioned the incidence of the mentioned deterioration of quality in carcasses will be further reduced. By a flock is meant such a number of animals that they act as a flock, i.e. they should feel a certain solidarity, and at the same time the number must not be so high that the individual pig is no longer able to keep up with what the other animals in the flock are doing.

The maximum number of animals which may form a flock depends, among other things, upon the hereditary herd instinct of the animals, and upon the exposure from the surroundings. An embodiment of the invention is characterized in that the units used include 12-20 pigs in each flock.

Under slaughterhouse conditions the mentioned number of animals may retain an established flock structure, if they are delivered as a unit of the size mentioned, or they may form a flock if they have been delivered as a large quantity consisting of more than the mentioned number of animals.

The size of the units mainly used is 15 pigs in each flock. This gives a good security that the animals will behave like a flock, without straining the costs of a system.

According to the invention, the treatment of the pigs as a unit may be controlled by one or more control devices. There may for instance be arrangements at the unloading platforms, passages and pens of the slaughterhouse which will only allow admittance into an area after an operator or a control system has indicated that the area is not being occupied by pigs belonging to other units. In this way, a mixture of the units is prevented, and the operator has only to follow the directions of a fixed work schedule, or perhaps he may leave the control of the work entirely to the control devices.

Preferably the control devices control the movement of mechanical means provided to restrict and/or drive the pigs as a unit. The devices may for instance activate engines or the like in gates which separate two areas between which the pigs of a unit are to move during the treatment at the slaughterhouse. In this way, the treatment of the pigs as units may take place more or less mechanically and independently of operators, which leads to a uniform and humane treatment of the pigs, and also the number of tasks for the operator will be reduced substantially.

An embodiment of the invention is characterized in that stalling rooms are used, the area of which corresponds to the size of the unit which has been fixed in connection with the transportation and stalling of the pigs. After the size of the unit has been fixed with a view to the practical possibilities, the pens of the slaughterhouse will primarily be so designed that each stalling room is designed for a unit of pigs, and no more, as this will result in an optimum utilization of the area available for pens.

Preferably each pen which has been established at the slaughterhouse today will make it possible to obtain an optimum pen utilization by implementing the procedure according to the invention, since each of the existing pens is intended for a large number of animals, e.g. 45 pigs, which means that the pens may be half empty, especially if the fixed units are to be of flock size.

By a favorable embodiment of the procedure, the utilization of the existing pen systems will be closer to optimum.

Preferably each pen is divided into several pen sections by means of partition walls, each section constituting a stalling room corresponding to the fixed size of the unit. A large pen may therefore be divided into smaller rooms, in which it is easier to maintain a high average use intensity when the pigs are to be treated in accordance with the invention. Thus, the procedure according to the invention may utilize the already existing pen facilities, into which it will only be necessary to build the devices which are needed to carry the procedure into effect, such as the mentioned partition walls.

When the unit has been fixed at a flock size of 12-20 pigs, it will be possible in practice to reach a solution with the existing pigsty, truck and pen facilities, which have very close to or the same area requirements as the systems used today, but where the supply of pigs to the slaughter line is considerably more flexible and results in much fewer injuries to the animals.

The pigs of a unit may be restricted by means of controllable, stationary gates, and be driven by means of movable, controllable gates. By controlling the gates the pigs of a unit are automatically kept in an area, or they are driven from one area into another, without any risk that they may be mixed with pigs from other units.

Having been driven out of a pen the pigs of a unit may be stalled in an intermediate pen, placed in front of the stunning apparatus. It appears that it is easier to control the supply of pigs into the passage in this way, since the driving-out from a pen may go on, even if there is e.g. a stop at the stunning apparatus. In this way, also the crowding is prevented which may arise when many pigs are admitted into a narrow passage.

Furthermore, it will be possible to place a stop plate at the blind end of the driving-out passage, without creating too much crowding of animals in the passage. This means, among other things, that the pigs are driven in the right direction towards the next passage, and that they do not stray into the blind end of the passage, from where they are difficult to drive out.

The invention also relates to a system for the stalling of pigs. In this system it should be possible to treat the pigs in units, so that the mentioned advantages with humane treatment of the animals and the consequent reduction of the incidence of carcasses with rind damages, blood splashings and deteriorated meat quality are achieved. It should be possible to mechanize and automate the system extensively in order to obtain a uniform treatment of the animals.

The system is of the type which includes a driving-in passage and a driving-out passage, as well as a number of oblong pens placed next to each other between the passages, which pens are each provided with an entrance gate and an exit gate at each end, as well as a driving gate which is movable in the longitudinal direction of the pen. The system is characterized in one or more stationary intermediate gates, placed in each pen, which gates are placed at such a distance from each other, the entrance gate and the exit gate, that the pen is divided into several sections.

The division of each pen into a number of smaller sections prevents pigs of a unit from being mixed with pigs from other units, without reducing the capacity of the system to any substantial extent. The result is a more humane treatment of the animals than is the case in the large pens being used today, where pigs from different supplied lots are mixed with each other. The incidence of carcasses with rind damages, blood splashings and deteriorated meat quality is reduced considerably.

Furthermore, the system may be built into already existing systems, as this is just a question of dividing existing pens up into sections. This will enable a quick adaptation to old pen facilities.

According to the invention, the intermediate gates are to be stationary. This is a contributory factor in simplifying the control systems which ensure that the pigs are kept separated from each other in the units. Stationary intermediate gates will only give rise to very little anxiety among the pigs when the gates are being operated, and in their open position they may be more or less flush with the side walls of the pen, which will result in a more gentle driving of the pigs in the pens.

Existing pen systems with side walls made of concrete may also be provided with additional plates between the gates, in particular plates of a material which is more humane to the animals, like a smooth, black plate, which will cause fewer injuries to the pigs than will be caused by the existing rough and white concrete walls. In this way the gates may be arranged to be flush with the additional plates mounted.

The division in question of a pen into smaller sections will also mean that the pigs in pen facilities which have been adapted to the invention may now be treated as a flock instead of being treated as a quantity. In accordance with this, an embodiment is characterized in that the intermediate gates are located at such a distance that each section of a pen may hold a number of pigs corresponding to a flock.

As explained above, a flock under slaughterhouse conditions may include 12-20 pigs. An embodiment is characterized in that each section of the pen may hold 1-20 pigs. The pen will primarily be divided into sections designed for 15 pigs.

In an embodiment of the system according to the invention there are one to five intermediate gates in each pen, so that each pen is divided into two to six sections. In this way the pens will not be any longer than will make it possible for a movable driving gate to operate all sections within a reasonable time.

In a favorable embodiment of the system according to the invention, the intermediate gates are side-hinged. Such gates will cause less anxiety among the pigs than will be caused by top-hinged gates, and they may be designed to allow passage of the driving gate while this is in its closed position. Therefore, the driving gates may retain its closed position during its operation of driving-in or driving-out of the pigs, even though it has to pass one or more open intermediate gates.

According to the veterinary regulations of at least one country (Denmark) there must be at least 0.5 m² of floor space for each pig in the slaughterhouse pens. It has shown that the pigs may be driven together without trouble on a smaller area, leaving only 0.4m² of floor space for each pig in the room of a pen. This fact is utilized in a favorable embodiment, according to which the intermediate gates are divided into two parts. In this embodiment, an intermediate gate may be closed behind a driving gate, after this driving gate has driven pigs into a section of the pen and has moved so far into the section that there is just room for the intermediate gate in two parts to move clear of the driving gate.

Each of the intermediate gates is primarily made up of two separate gates, which are hinged to their individual side wall in the pen. This construction is sturdy, and it can normally withstand the impact from the pigs. By the word "gates" in the present description is not only meant gates as this is commonly understood, but it also means gates in the form of plates, lattice work or similar designs, which may obstruct the passage through an oblong pen, and which through turning round a shaft, hoisting or other movement open the passage again for the pigs.

The driving gate, which may be operated in the longitudinal direction of the pen, may be of a frame construction provided with a driving plate and wheels. Rails corresponding to the wheels are located at or near the top of the side walls of the pen. In its closed position the plate part of the gate should substantially be able to fill up the cross section of the pen, enabling the pigs to being driven without the danger of being squeezed. In the open position the plate part is hoisted or swung up, so that the driving gate may pass over the pigs in the pen without touching them, or it enables the pigs to pass forward in the pen.

The gates in the system according to the invention may be operated manually, but the use of motor-driven gates is to be preferred. These may be controlled according to a program in which the time has been divided up in such a way that the pigs get a uniform and quiet treatment, while the time factor is adapted to the slaughtering speed of the slaughterhouse.

A preferred embodiment is characterized in that one or more gates are motor-driven, and that one or more control devices are provided for the control of such gates.

One control device may control the gates in a pen, in the driving-in passage, or in the driving-out passage, but it is also possible to build up a device which handles and controls the operation of the total system, right from the moment when the pigs are unloaded until the moment when they are admitted into the stunning apparatus.

The driving-in passage and the driving-out passage may be equipped with mechanical devices which handle the separation of the units of pigs automatically and which drive the animals forward in the treatment system. Appropriate intermediate gates, elevating gates and travelling/elevating gates are used, which are of the same type as those being used in the pens of the system. In this way, it is possible to keep the animals separated in units from the moment they leave the transport truck till they reach the stunning apparatus.

In a simplified system, the mechanical devices in question are provided in the pens, whereas the driving and maybe the separation is performed more or less manually by means of the usual means, like driving boards.

An intermediate pen may be placed after the driving-out passage and in front of the stunning apparatus, which pen may be restricted and/or operated by means a controllable, stationary gates and/or movable, controllable gates. By using this embodiment, a crowding of the pigs is prevented when there is e.g. a stoppage at the stunning apparatus. Furthermore, it is easier to guide the animals in the direction of the passage, since the blind end of the driving-out passage may be obstructed by a gate.

DESCRIPTION

The invention will be described in detail below with reference to the drawings, wherein FIG. 1 shows a system for the stalling of 450 pigs, and FIG. 2 a perspective drawing of a pen in the system.

The system includes ten oblong pens 1 which are placed be found in already existing systems. Each pen is divided into three sections, 3a, 3b and 3c, by means of two sets of intermediate gates 4. On the side walls of the pens are mounted plates of smooth steel or plastic. Each section has an inside dimension of about 1.6×4.7 m, which leaves sufficient room for 15 pigs to be stalled. In their hinges the intermediate gates swings the gates 90°, so that they will either open to allow, or close to prevent, passage from one section of the pen into the next section. In their open position the gates are located inside niches, which have been formed when the plates were mounted on the side walls 5 of the pens.

At the entrance end of each pen there is a manually operated swing gate 6, which in its closed position prevents the animals in a pen from walking out into a driving-in passage 7, which is located at the end of the entrance into the pen. In its open position the swing gate will obstruct the passage through the driving-in passage, and the pigs being driven forward will be guided into the appropriate pen.

At the exit end of each pen there is a stationary elevating gate 8, which by means of a motor may raise and lower a plate, which in its lowest position will prevent the animals in the pen from walking out into a driving-out passage 9 at the end of the pen.

Furthermore, there is in each pen a travelling/elevating gate 10, which may be moved in the entire length of the pen. The gate is provided with a carriage system, the driven wheels of which run on rails 21, which are located on the top of the side walls of the pen. The gate is also provided with a plate which may be raised and lowered by means of a motor or by a pneumatic-air cylinder, so that it will either obstruct the passage in the pen or it will allow the pigs to pass underneath.

In its lowered position, the gate may pass the inter mediate gates when these are open. The gate 10 acts as a mechanical driving board, when, in its closed position, it is moved forward in the pen by means of the carriage system.

In the side walls of the pens there may be some manually operated side gates leading into the inspection passages, through which sick animals may be guided into special pens.

The driving-out passage 9 opens into a semicircle 11, which leads into an accumulation passage 12. This ends in a double driving passage 13, in which the pigs are arranged one after the other before they are shut in and stunned in a stunning trap.

The driving passage 9 is operated by a travelling elevating gate 14 corresponding to those which are mounted in the pens 1. Furthermore, there is a guiding plate 15, which may be locked to the sides of the driving passage 9. This will prevent the pigs in an open pen from walking towards the blind end of the driving-out passage 9.

There is a corresponding travelling/elevating gate 16 for the operation of the semicircle 11. There is a third travelling/elevating gate 17 in the accumulation passage 12 to drive the pigs towards the passage 13.

A control system is also included, the function of which will appear from the following explanation of the use of the system.

Pigs are transported to the slaughterhouse in trucks which have room for 45 animals, for example. In order to keep animals from different pigsties or suppliers separated, the truck may be divided into three areas, for instance, with room for 15 animals in each.

After the truck has been placed at the unloading platform of the slaughterhouse, the animals will be driven manually from one area into the driving-in passage 7. If the truck is not divided into areas, a flock of 15 animals will be driven into the driving-in passage 7. The animals are guided by the open swing gate 6 into the appropriate pen 1, in which the travelling/elevating gates 10 and the intermediate gates 4 are open. When the animals have entered the pen, the gate 6 will be closed, and the driving-in operator pushes a button which starts the automatic filling operation of the section of the pen.

The elevating gate 10 closes in its back position in the pen, and then it travels slowly forward in the pen, so that the pigs are driven towards the remotest section of the pen. The speed of the gate is 30 cm/sec, for example. Inside section 3a the gate will be stopped in a position immediately before the open intermediate gates, and then these will be closed automatically.

The plate in the travelling/elevating gate 10 is raised to its top position, leaving the entire pen section 3a open for the pigs. Then the travelling/elevating gate 10 returns to its hindmost position at the gate 6.

While the section 3a has been filled, a new flock of animals has been driven manually into the driving-in passage 7. As soon as the last animal is inside the pen 1, the gate 6 will be closed, causing the travelling/elevating gate to close and then to travel forward in the pen, driving the animals in front of it. When the travelling-/elevating gate has reached the position immediately in front of the open intermediate gates, it will stop and the intermediate gates will be closed automatically. The plate of the travelling/elevating gate will be raised. There is a flock No. 2 in the pen section 3b. The travelling/elevating gate will move forward to the position which is shown at the top of FIG. 1.

In the meantime a new flock of e.g. 15 animals has been driven from the unloading platform and into the driving-in passage 7. When the animals are inside the pen section 3c, the gate 6 will be closed. The pen is now filled with animals, which the operator will indicate to the control system and to the operators who are to empty the pen by a signal activated by a button.

The driving-in operator may go on and fill up the next pen without having to consider what will happen next in the pen which has just been filled.

The aim is to use trucks which are divided into fixed units corresponding to the size of the room in the pen. If a truck arrives which, for some reason, is not divided into sections in the prescribed way, e.g. with 25 animals per room on the truck, the first 15 animals may be placed in the front section of the pen, and the next 10 animals in the middle section. Animals from a subsequent truck load or room on the truck will then be placed in the last section.

In this way the process of filling up the pens goes on, the animals supplied being guided in flocks into a pen section, and animals from different supplied lots would not be mixed up during the driving-in and stalling operation. This means that each section holds all animals from a supplied lot or a number of animals corresponding to a flock from a supplied lot, but no animals from different supplied lots.

Thus, the formation of flocks which has been established during the transportation into the slaughterhouse, or before, is maintained during the driving-in and stalling process, or a transported quantity of pigs is divided up and treated in fractions which encourage the formation of flocks in the pen sections.

To empty a pen, when pigs are to be slaughtered, an operator will push a button which starts the automatic emptying operation. The gate 15 will be positioned as an extension of one of the side walls of the pen which is to be emptied, and it will be locked to the sides of the passage 9. The travelling/elevating gate 14 will move to a position immediately in front of the gate 15, and it will be closed. The control system will activate the motor, which brings the elevating gate 8 of the pen into the open position. The pigs in pen section 3a may now walk out into the passage 9.

The travelling/elevating gate 10 of the pen is closed automatically, and it will travel from the start position in front of the closed intermediate gates to the end position at the elevating gate 8. During this slow movement of the gate the animals are driven out of the pen section and into the passage 9.

The intermediate gates 4 between sections 3a and 3b will be opened during the forward movement of the travelling/elevating gate in the pen section 3a.

As soon as the travelling/elevating gate 10 stops in its position at the elevating gate 8 the automatic system will start the motor in the travelling/elevating gate 14. It drives the pigs forward in the passage 9. The travelling/elevating gate 16 is located at the end of the passage 9 in its open position, which means that the animals are driven into the curved section 11. When all of the animals have been driven into the curved section 11, the gate 16 will be closed. The travelling/elevating gate 14 is opened automatically, and it returns to its start position at the gate 15, whereas the gate 16 travels around in the curved section 11. In the accumulation passage 12 the driving process will be taken over by the travelling/elevating gate 17, which is closed behind the driven-in animals, and which will drive them forward towards the passage 13. The travelling/elevating gate 16 returns to its start position and opens, ready to receive animals from a new pen section.

The driving-out of animals from the pen section 3b will be started as soon as the travelling/elevating gate 14 has passed the exit of the pen in its driving movement forward towards the curved section 11. The travelling/elevating gate 10 is opened and moved backwards to a position immediately in front of the closed intermediate gates 4 between the pen sections 3b and 3c. After the travelling/elevating gate 9 has been closed automatically, the motor of the gate is started, which brings the gate into a forward movement in the pen, driving the flock of pigs in front of it out into the passage 9. The intermediate gates are opened behind the travelling/elevating gate.

When the travelling/elevating gate 10 has reached a position immediately at the passage 9, the travelling/elevating gate 14 may take over the driving. It moves forward, driving the pigs towards the curved section 11. Here and in the accumulation passage 12 the driving is performed in the same way as explained above in connection with the flock from section 3a.

As soon as the travelling/elevating gate 14 has passed the exit of the pen in its movement towards the curved section 11, the automatic system will see to it that the travelling/elevating gate 10 is opened. The travelling/elevating gate 10 is moved back to a position immediately in front of the swing gate 6, and it is closed. The motor of the gate 10 is started, causing the gate to move forward in the pen. The pigs from section 3c are driven out of the pen and into the passage 9.

When the travelling/elevating gate 10 is in its front position at the passage 9, the travelling/elevating gate 14 is started from its position at the gate 15. The pigs from section 3c are driven towards the curved section II and then into the passage 12 in the same way as explained above.

As soon as the travelling/elevating gate 14 has passed the exit of the pen in its movement towards the curved section 11, the travelling/elevating gate is opened and returned to its start position at the gate 6. The elevating gate 8 is closed. With that, the driving-out operation has been finished, and the control system may signal this to the operator, so that he—if necessary—may start the emptying of a new pen. The final signal will at the same time be sent to the operation desk of the driving-in operator, where it will be indicated automatically by means of a lamp or the like that the pen is now vacant.

Thus, the driving-in operator and the driving-out operator may work independently of each other. The driving-in operator may currently take the pigs as soon as they are delivered at the unloading platform, while the driving-out operator independently of this may deliver the pigs to the stunning trap at the speed of the slaughter line, in consideration of breaks in work, suspensions of work and the like.

Please note that a flock of pigs being driven out need not necessarily be kept separated from the following flock, as described above. The animals of an entire pen may for instance be driven out by allowing the elevating gate and the intermediate gates 4 to open, and the animals will collectively be driven out of the pen by means of the travelling/elevating gate 10.

Another possibility is to keep the animals separated in flocks corresponding in size to a section of a pen, until they reach the passage 12. Here there is room enough for animals from several sections. Each pen may consist of more than three sections. The procedures for the first and the last sections will then be the same as the procedures explained above in connection with the filling and emptying of sections 3a and 3c, whereas the procedure for each of the intermediate sections corresponds to the procedure explained above in connection with section 3b.

There may be more pens than the ten pens which are shown on the drawing. If, for instance, a pen capacity of for instance 900 animals is required, there may be 20 pens of the size illustrated, located next to each other.

If required, the driving into the pen may take place by means of an automatic system, instead of manually. For this purpose gates may be used which are constructed in a way which is similar to that of the gates in the driving-out system described above.

What is claimed is:

1. System for the stalling of animals said system comprising: partition means for defining a driving-in passage, a driving-out passings, an elongate pen disposed between said passages, a pen entrance for communication between said pen and said driving-in passage, and a pen exit for communication between said pen and said driving-out passage; an entrance gate for opening and closing said pen entrance; an exit gate for opening and closing said pen exit; a driving gate movable longitudinally of said pen; and at least one stationary intermediate gate disposed in said pen at a predetermined distance from said entrance gate and said exit gate to divide said pen into a plurality of sections of predetermined size; said driving gate and said stationary intermediate gate extending transversely of said pen from one side of the pen to the opposite side.

2. The system of claim 1, wherein said sections have a capacity to hold a number of animals corresponding to a flock.

3. The system of claim 2, wherein said sections hold 12-20 animals.

4. The system of claim 1, wherein said pen receives a plurality of intermediate gates 5. The system of claim 1, wherein said at least one intermediate gate is a two-part, side-hinged member.

6. The system of claim 1, wherein said at least one intermediate gate is made up of two separate gates, which are each hinged to a separate side wall in the pen.

7. The system of claim 1, 2, 3, 4, 5 or 6 further comprising motor means for driving said driving gate and controls for controlling said motor means.

* * * * *